United States Patent
Alexander et al.

(10) Patent No.: US 6,813,730 B2
(45) Date of Patent: Nov. 2, 2004

(54) METHOD, COMPUTER PROGRAM PRODUCT, AND SYSTEM FOR DETECTING A PERIPHERAL DEVICE IN A COMPUTER SYSTEM

(75) Inventors: Marc D. Alexander, Cedar Park, TX (US); Ricardo Luis Martinez, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 524 days.

(21) Appl. No.: 09/903,126

(22) Filed: Jul. 11, 2001

(65) Prior Publication Data
US 2003/0014696 A1 Jan. 16, 2003

(51) Int. Cl.[7] .............................................. G06F 11/30
(52) U.S. Cl. ............................... 714/43; 710/9; 710/15; 710/17; 710/19; 713/1; 714/48
(58) Field of Search ............................... 714/42, 44, 43, 714/48, 8, 10, 104; 710/15, 17, 19, 9, 301, 302; 713/1, 2, 100

(56) References Cited

U.S. PATENT DOCUMENTS

| | | | |
|---|---|---|---|
| 5,014,193 A | * | 5/1991 | Garner et al. .................. 710/10 |
| 5,222,228 A | * | 6/1993 | Asprey ........................... 713/1 |
| 5,790,889 A | | 8/1998 | Witte |
| 5,905,914 A | * | 5/1999 | Sakai et al. .................... 710/67 |
| 5,909,560 A | * | 6/1999 | Kenny et al. ................. 710/305 |
| 6,101,559 A | * | 8/2000 | Schultz et al. ................. 710/15 |
| 6,141,704 A | * | 10/2000 | Huang ........................... 710/15 |
| 6,178,469 B1 | * | 1/2001 | Hennessy et al. ............... 710/9 |
| 6,311,242 B1 | * | 10/2001 | Falkenburg et al. ......... 710/301 |
| 6,393,507 B2 | * | 5/2002 | Klein .......................... 710/313 |
| 6,473,811 B1 | * | 10/2002 | Onsen ........................... 710/15 |
| 6,487,474 B1 | * | 11/2002 | Goodman et al. ........... 700/245 |
| 6,671,831 B1 | * | 12/2003 | Sartore et al. ................. 714/44 |

* cited by examiner

Primary Examiner—Robert Beausoliel
Assistant Examiner—Yolanda L. Wilson
(74) Attorney, Agent, or Firm—Haynes and Boone, LLP

(57) ABSTRACT

A method, computer program product, and system are provided that include reading a first indicator from a memory location, checking a first port associated with the first indicator for the presence of a peripheral device, and, in response to the peripheral device not being present on the first port, storing a second indicator associated with a second port in the memory location.

21 Claims, 5 Drawing Sheets

METHOD, COMPUTER PROGRAM PRODUCT, AND SYSTEM FOR DETECTING A PERIPHERAL DEVICE IN A COMPUTER SYSTEM

BACKGROUND

The disclosures herein relate generally to computer systems and more particularly to a method, computer program product, and system for detecting a peripheral device in a computer system.

Modern computer systems include ports configured to receive a peripheral device. As part of the process of booting a computer system, the system may check each port in the system to detect one or more peripheral devices coupled to each port. Checking each port in the system, however, adds to the amount of time it takes to boot the computer system. This time delay may be worsened where the system looks for and does not find a particular device on a particular port.

It would be desirable to reduce the amount of time is takes to boot a computer system.

SUMMARY

One embodiment, accordingly, provides a method that includes reading a first indicator from a memory location, checking a first port associated with the first indicator for the presence of a peripheral device, and, in response to the peripheral device not being present on the first port, storing a second indicator associated with a second port in the memory location.

A principal advantage of this embodiment is that it may reduce the amount of time it takes to boot a computer system. A computer system may check for a peripheral device in a location where the device was previously detected. In doing so, the computer system may more rapidly locate the peripheral device and reduce the amount of time it takes to boot the computer system.

DETAILED DESCRIPTION

Figure 1:
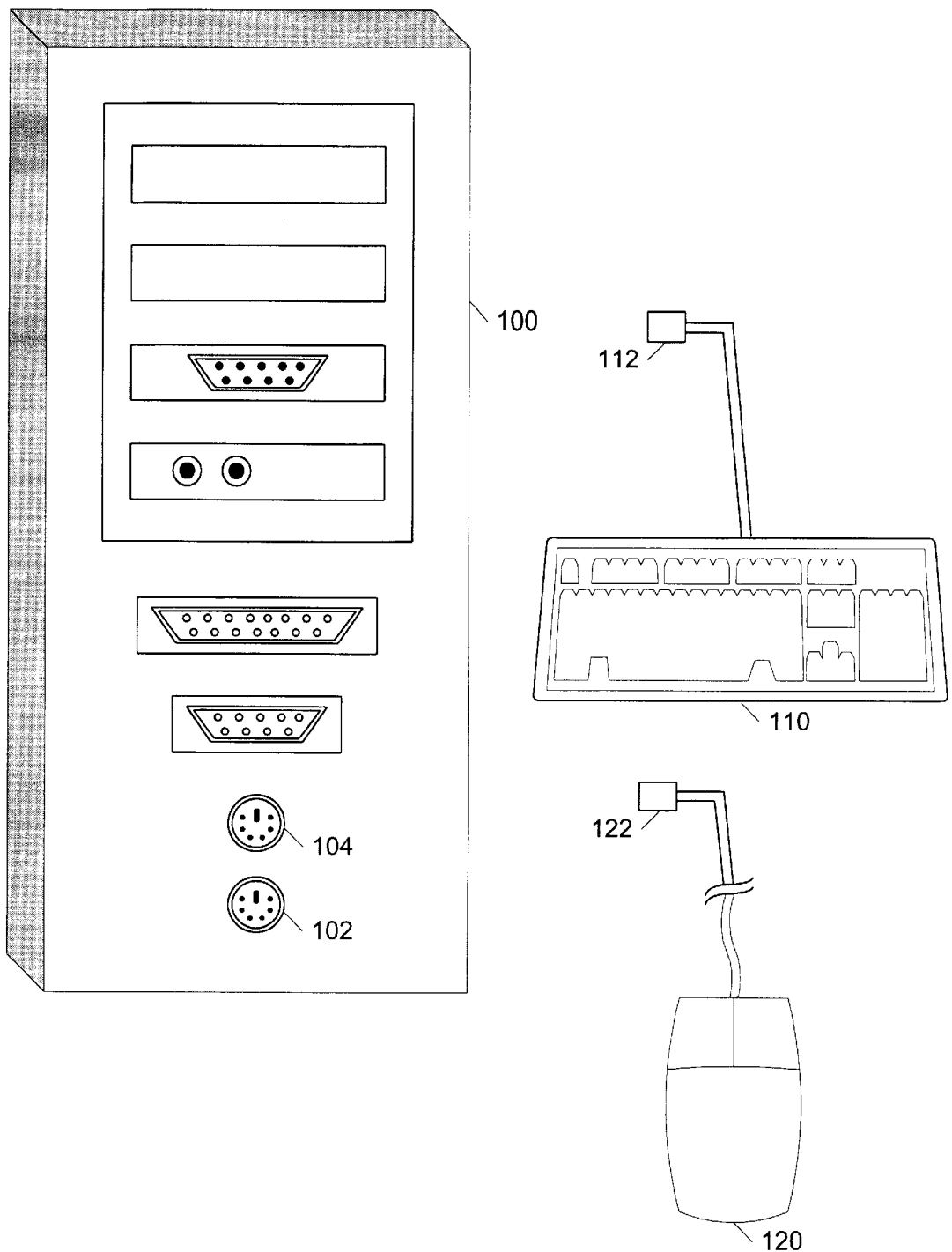
FIG. 1 is a diagram illustrating a first embodiment of a chassis for housing a computer system and for receiving peripheral devices associated with the computer system.

FIG. 1 is a diagram illustrating a first embodiment of a chassis 100 for housing a computer system and for receiving peripheral devices 110 and 120 associated with the computer system. Peripheral device 110 includes a keyboard and will be referred to herein as keyboard 110. Peripheral device 120 is a mouse and will be referred to herein as mouse 120. In other embodiments, peripheral devices 110 and 120 may be other types of devices and/or may be configured to perform other functions.

In the embodiment shown in FIG. 1, a user of the computer system may connect keyboard 110 to port 102 and mouse 120 to port 104. Alternatively, the user of the computer system may connect keyboard 110 to port 104 and mouse 120 to port 102. Keyboard 110 couples to the computer system housed in chassis 100 by coupling connector 112 to port 102 or port 104. Similarly, mouse 120 couples to the computer system housed in chassis 110 by coupling connector 122 to port 102 or port 104.

In order for the computer system to function properly, the computer system detects the presence of keyboard 110 on port 102 or port 104. Similarly, the computer system detects the presence of mouse 120 on port 102 or port 104.

Figure 2:
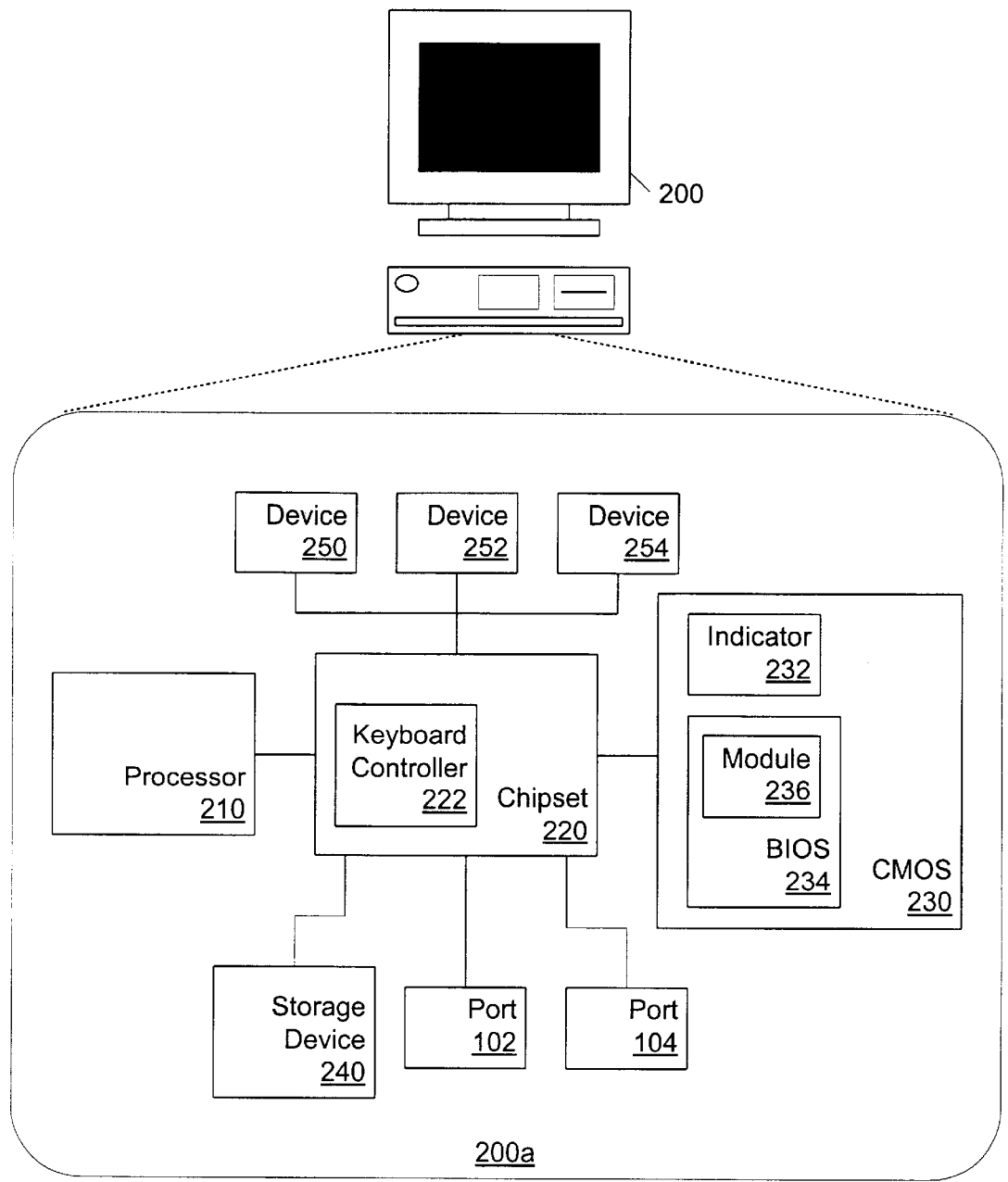
FIG. 2 is a diagram illustrating an embodiment of selected portions of a computer system.

FIG. 2 is a first diagram illustrating an embodiment of selected portions of a computer system 200. In one embodiment, computer system 200 is housed in a chassis similar to chassis 100 shown in FIG. 1. In other embodiments, computer system 200 may be included in other types of housings. As shown in a box 200a, computer system 200 includes a processor 210, a chipset 220, ports 102 and 104, a CMOS memory 230, a storage device 240, and a plurality of devices 250, 252, and 254. Chipset 220 includes a keyboard controller 222. CMOS 230 includes an indicator 232 and a basic input output system (BIOS) 234. BIOS 234 includes a module 236.

CMOS 230 is one example of an apparatus for storing module 236 such that module 236 is accessible by computer system 200. In other embodiments, other apparatus may be used such as a CD-ROM, a floppy disk, a hard disk, or other storage media.

Module 236 includes instructions that are configured to cause computer system 200 to detect the presence of peripheral devices on ports such as port 102 and port 104 in computer system 200. In particular, module 236 causes computer system 200 to detect the presence of a keyboard, such as keyboard 110 shown in FIG. 1, on port 102 or port 104 in response to computer system 200 being booted up. Computer system 200 may boot in response to being powered up, i.e. turned on, or restarted. In the embodiment shown in FIG. 2, module 236 is included in BIOS 234. In other embodiments, the software of module 236 may be included in a system firmware, an operating system, or other software configured to boot or reboot the computer system.

Indicator 232 includes one or more bits that store a value. The value identifies a port of computer system 200. In an embodiment where computer system 200 is included in chassis 100 shown in FIG. 1, indicator 232 identifies either port 102 or port 104 according to a value of indicator 232. For example, in an embodiment where indicator 232 includes a single bit, then a logical "one" value of the bit may identify port 102 and a logical "zero" value of the bit may identify port 104. In other embodiments, indicator 232 may include other bits or other values to identify one or more of a set of ports.

In response to booting or rebooting, computer system 200 executes instructions in BIOS 234 to identify and initialize components, including peripheral devices, of computer system 200. One of the functions performed by BIOS 234 includes detecting a location of a keyboard coupled to computer system 200. In the embodiment shown in FIG. 2, computer system 200 executes module 236 to perform this function. Module 236 causes indicator 232 to be read. As noted above, indicator 232 identifies either port 102 or port 104. Module 236 then causes the port identified by indicator 232, i.e. port 102 or port 104, to be checked for the presence of the keyboard. If the keyboard is present on the port identified by indicator 232, then module 236 completes and returns control of computer system 200 to BIOS 234.

If the keyboard is not present on the port identified by indicator 232, then module 236 causes another port to be checked for the presence of the keyboard. In the embodiment shown in FIG. 2, module 236 causes the port not identified by indicator 232 to be checked. For example, if indicator 232 identifies port 102, then module 236 causes port 104 to be checked. If the keyboard is detected on port 104 in this example, then module causes a memory location associated with indicator 232 to store a value that identifies port 104. In other embodiments, additional ports may be checked for the presence of the keyboard or another peripheral device. A value that identifies the port where the keyboard or other peripheral device is detected may then be stored in indicator 232. In addition, module 236 may check other ports for the presence of other types of peripheral devices using indicator 232 or another indicator.

By replacing the value stored in indicator 232, module 236 causes the identity of the port where the keyboard was last detected to be saved. By saving the identity of the port, module 236 will first check this port for the presence of the keyboard in response to computer system 200 being powered up, restarted, booted, or rebooted, i.e. the next time module 236 executes to detect the port where the keyboard is connected.

In one embodiment, module 236 causes a port to be checked for the presence of a peripheral device by performing a port call to the port. To perform a port call, module 236 causes a signal to be sent to the port. If module 236 does not detect a response to the signal within a predetermined time period, i.e. the port call times out, then module 236 assumes that the peripheral device is not on the port and checks another port for the presence of the peripheral device. Module 236 continues to cause ports to be checked until it either detects the peripheral device or checks the set of ports where the peripheral device may be found. If the peripheral device is not found on any of the set of ports, then an error may be reported. After module 236 receives a response to the signal from a port that indicates the presence of the peripheral device, module 236 returns control of computer system 200 to BIOS 234. In an embodiment where the peripheral device is a keyboard, module 236 may also cause a value associated with port 102 or port 104 to be stored in a register in keyboard controller 222. In other embodiments, the presence of a peripheral device on a port may be checked in other ways.

Figure 3:
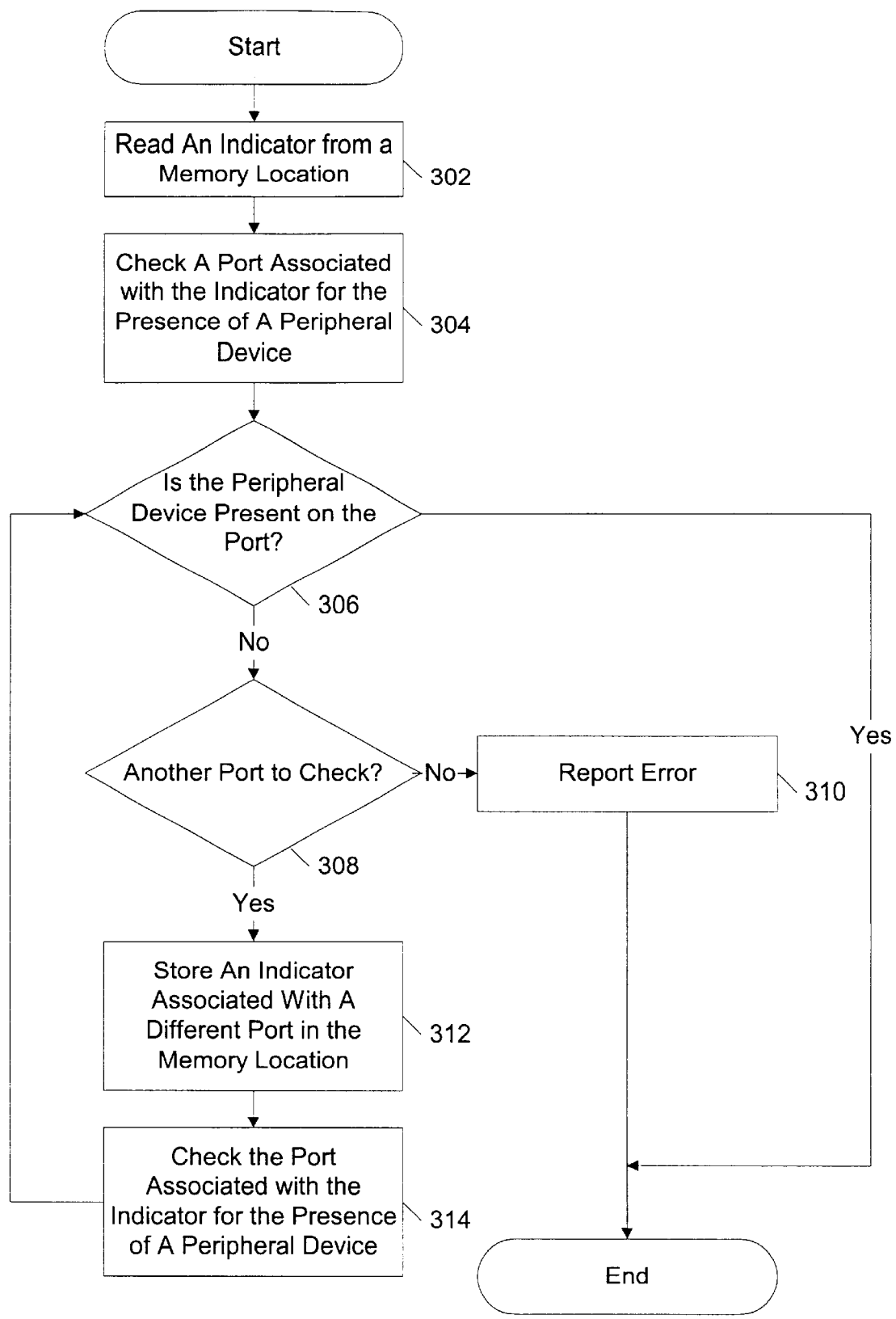
FIG. 3 is a flow chart illustrating an embodiment of a method for detecting a peripheral device in a computer system.

FIG. 3 is a flow chart illustrating an embodiment of a method for detecting a peripheral device in a computer system. An indicator is read from a memory location as indicated in step 302. A port associated with the indicator is checked for the presence of a peripheral device as indicated in step 304. A determination is made as to whether the peripheral device is present on the port as indicated in step 306. If the peripheral device is present at the port, then the method concludes as indicated.

If the peripheral device is not present at the port, then a determination is made as to whether there is another port to check for the presence of the peripheral device as indicated in step 308. If there is no other port to check, then an error is reported as indicated in step 310. The error may indicate that the peripheral device was not found on any of the ports checked by the method.

If there is another port to check, then an indicator associated with a different port is stored in the memory location as indicated in step 312. The port associated with the indicator is checked for the presence of the peripheral device as indicated in step 314. Depending on the implementation, the functions described in steps 312 and 314 may occur in any order or substantially simultaneously. The method then returns to the determination in step 306.

Figure 4:
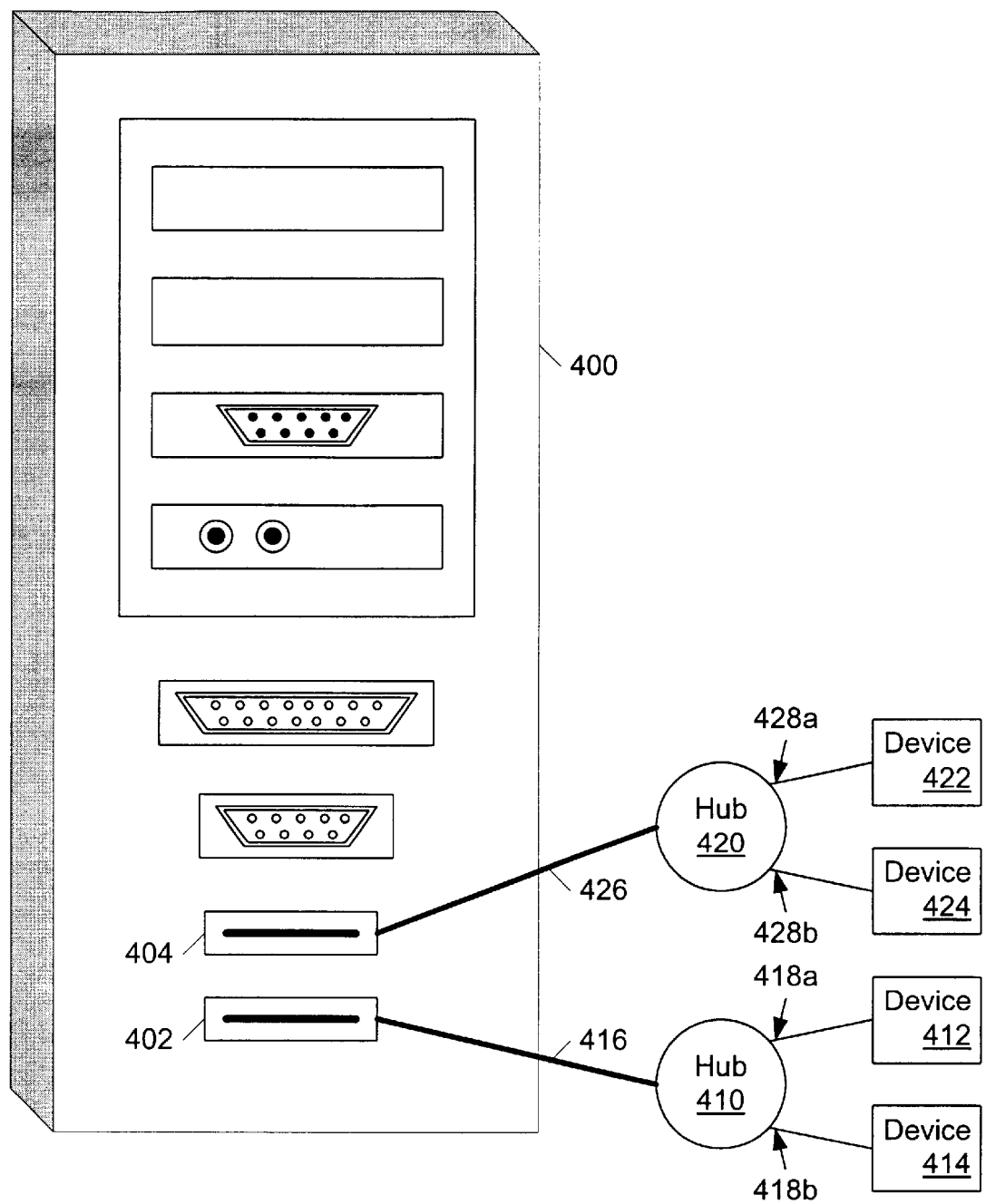
FIG. 4 is a diagram illustrating a second embodiment of a chassis for housing a computer system and for receiving peripheral devices associated with the computer system.

FIG. 4 is a diagram illustrating a second embodiment of chassis 400 for housing a computer system and for receiving peripheral devices associated with the computer system. Chassis 400 is coupled to a hub 410 and a hub 420 using a port 402 and a port 404, respectively, as indicated by a connection 416 and a connection 426, respectively. Hub 410 is coupled to a device 412 and a device 414 using a port 418a and a port 418b, respectively. Hub 420 is coupled to a device 422 and a device 424 using a port 428a and a port 428b, respectively. Devices 412, 414, 422, and 424 are each a peripheral device such as a keyboard or a mouse. In other embodiments, other hubs may be attached to hub 410 or hub 420 and other numbers of devices may be attached to hub 410, hub 420, or other hubs.

Figure 5:
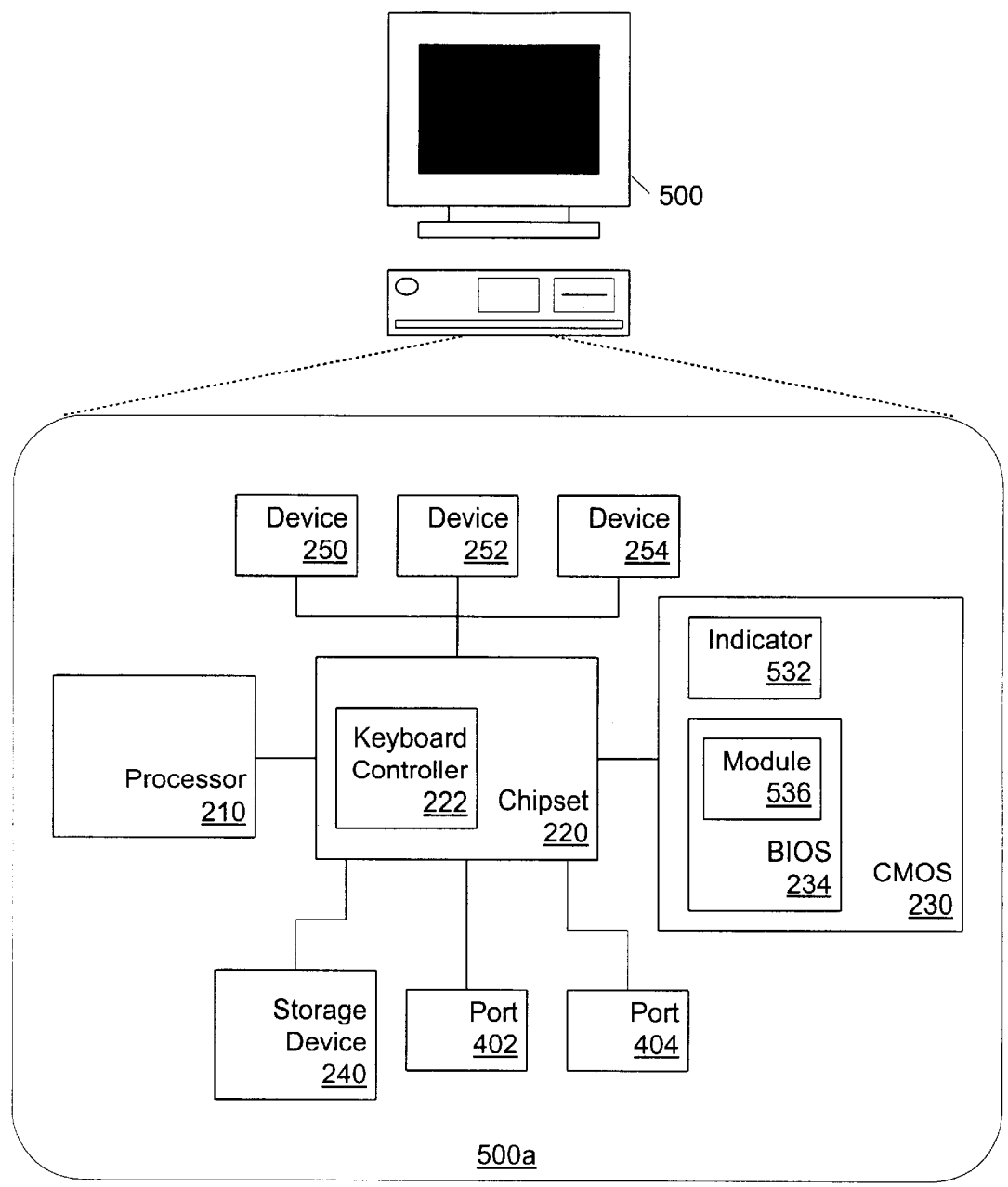
FIG. 5 is a diagram illustrating an embodiment of selected portions of a computer system.

FIG. 5 is a diagram illustrating an embodiment of selected portions of a computer system 500. As shown in a box 500a, computer system 500 includes a processor 210, a chipset 220, ports 402 and 404, a CMOS memory 230, a storage device 240, and a plurality of devices 250, 252, and 254. Chipset 220 includes a keyboard controller 222. CMOS 230 includes an indicator 532 and a basic input output system (BIOS) 234. BIOS 234 includes a module 536.

CMOS 230 is one example of an apparatus for storing module 536 such that module 536 is accessible by computer system 500. In other embodiments, other apparatus may be used such as a CD-ROM, a floppy disk, a hard disk, or other storage media.

In one embodiment, computer system 500 is housed in chassis 400 shown in FIG. 4. In this embodiment, computer system 500 is coupled to hubs 410 and 420 and devices 412, 414, 422, and 424 using ports 402 and 404 as shown in FIG. 4. In other embodiments, computer system 500 may be included in other types of housings.

Referring to both FIG. 4 and FIG. 5, module 536 includes instructions that are configured to cause computer system 500 to detect the presence of peripheral devices on ports such as ports 402, 404, 418a, 418b, 428a, and 428b in computer system 500 in response to computer system 500 being booted up. Computer system 500 may boot in response to being powered up, i.e. turned on, or restarted. In the embodiment shown in FIG. 5, module 536 is included in BIOS 234. In other embodiments, the software of module 536 may be included in a system firmware, an operating system, or other software configured to boot or reboot the computer system.

Indicator 532 is configured to store one or more values that identify one or more ports where one or more peripheral devices are found. Each value identifies a location of a port such as port 402, 404, 418a, 418b, 428a, or 428b.

In response to booting or rebooting, computer system 500 executes instructions in BIOS 234 to identify and initialize components of computer system 500 including hubs 410 and 420 and devices 412, 414, 422, and 424. One of the functions performed by BIOS 234 includes detecting locations of hubs and devices coupled to computer system 500. In the embodiment shown in FIG. 5, computer system 500 executes module 536 to perform this function. Module 536 causes indicator 532 to be read. Module 536 then causes one or more locations identified by indicator 532 to be checked for the presence of peripheral devices. If a particular peripheral device is present at the location identified by indicator 532, then module 536 either continues checking for the presence of other peripheral devices on other ports or completes and returns control of computer system 500 to BIOS 234.

If a device is not present at the location identified by indicator 532, then module 536 causes another port to be checked for the presence of the device. In the embodiment shown in FIG. 5, module 536 causes a port not identified by indicator 532 to be checked. For example, if indicator 532 identifies port 428a, then module 536 causes another port such as port 428b, 418a, or 418b to be checked. If the device is detected on port 418b, for example, then module 536 causes a memory location associated with indicator 532 to store a value that identifies port 418b.

By replacing one or more values stored in indicator 532, module 536 causes the identity of the ports where one or more devices were last detected to be saved. By saving the identity of the port, module 536 causes these last known ports to be checked for the presence of the devices in response to computer system 200 being powered up, restarted, booted, or rebooted, i.e. the next time module 536 executes.

In one embodiment, module 536 causes a port to be checked for the presence of a peripheral device by performing a port call to the port. To perform a port call, module 536 causes a signal to be sent to the port. If module 536 does not detect a response to the signal within a predetermined time period, i.e. the port call times out, then module 536 assumes that the peripheral device is not on the port and checks another port for the presence of the peripheral device. Module 536 continues to cause ports to be checked until it either detects the peripheral device or checks the set of ports where the peripheral device may be found. If the peripheral device is not found on any of the set of ports, then an error may be reported. After module 536 receives a response to the signal from a port that indicates the presence of the peripheral device, module 536 returns control of computer system 500 to BIOS 234. In an embodiment where the peripheral device is a keyboard, module 536 may also cause a value associated with a port to be stored in a register in keyboard controller 222. In other embodiments, the presence of a peripheral device on a port may be checked in other ways.

Module 536 may also cause computer system 500 to capture a peripheral search order based on a topology of busses and peripheral devices coupled to ports 402 and 404 of computer system 500. In the process in which peripheral devices and hubs coupled to computer system 500 are detected, module 536 causes a peripheral search order, i.e. the sequential order that peripheral devices are detected by computer system 500, to be detected and stored in a memory such as CMOS 230 or storage device 240. In response to a subsequent execution of module 536, module 536 may detect the stored peripheral search order and use the peripheral search order to detect the presence of one or more particular devices on one or more ports.

In one embodiment, port 402 and port 404 are Universal Serial Bus (USB) ports and connections 416 and 426 are USBs. In other embodiments, port 402 and port 404 may be other types of ports that are configured to operate in conjunction with a hub such as hub 410 or hub 420 and connections 416 an 426 may be other types of busses or connections.

In other embodiments, other types and numbers of peripheral devices and hubs may be coupled to ports 402 and 404 of computer system 500. In particular, other hubs may be connected to one or more ports of hubs 410 and 420.

As can be seen, the principal advantages of these embodiments are that they may reduce the amount of time it takes to boot a computer system. A computer system may check for a peripheral device in a location where the device was previously detected. In doing so, the computer system may more rapidly locate the peripheral device and reduce the time amount of time it takes to boot the computer system.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method performed by a computer system comprising:
coupling the computer system to a first hub including a first port and to a second hub including a second port;
reading a first indicator from a memory location;
checking the first port associated with the first indicator for the presence of a peripheral device;
in response to the peripheral device not being present on the first port, storing a second indicator associated with a second port in the memory location; and
coupling a bus to the first hub and the computer system;
wherein the computer system is for:
detecting a peripheral search order associated with the bus; and
storing the peripheral search order.

2. The method of claim 1 wherein the peripheral device includes a keyboard.

3. The method of claim 1, further comprising:
checking the first port for the presence of the peripheral device by performing a port call to the first port.

4. The method of claim 3, further comprising:
detecting whether the peripheral device is present on the first port by determining whether the first port responds to the port call within a predetermined time period.

5. The method of claim 1, further comprising:
reading the first indicator from the memory location, the memory location including a bit.

6. The method of claim 5 wherein the first indicator includes a first value of the bit and wherein the second indicator includes a second value of the bit.

7. The method of claim 1, further comprising:
reading the first indicator from the memory location in response to booting the computer system.

8. A system comprising:
a computer system coupled to a first hub including a first port and to a second hub including a second port;
the computer system for:
reading a first indicator from a memory location;
checking a first port associated with the first indicator for the presence of a peripheral device;
in response to the peripheral device not being present on the first port, storing a second indicator associated with a second port in the memory location; and
a bus coupled to the first hub and the computer system;
wherein the computer system is for:
detecting a peripheral search order associated with the bus; and
storing the peripheral search order.

9. The system of claim 8, wherein the peripheral device includes a keyboard.

10. The system of claim 8, wherein the computer system is for:
checking the first port for the presence of the peripheral device by performing a port call to the first port.

11. The system of claim 10, wherein the computer system is for:
   detecting whether the peripheral device is present on the first port by determining whether the first port responds to the port call within a predetermined time period.

12. The system of claim 8, wherein the memory location includes a bit.

13. The system of claim 12, wherein the first indicator includes a first value of the bit, and wherein the second indicator includes a second value of the bit.

14. The system of claim 8, wherein the computer system is for:
   reading the first indicator from the memory location in response to the computer system being booted.

15. A system comprising:
   a first hub that includes a first port;
   a second hub that includes a second port;
   a computer system coupled to the first hub and the second hub for:
      reading a first indicator from a memory location;
      checking the first port associated with the first indicator for the presence of a peripheral device;
      in response to the peripheral device not being present on the first port, storing a second indicator associated with the second port in the memory location; and
   a bus coupled to the first hub and the computer system;
   wherein the computer system is for:
      detecting a peripheral search order associated with the bus; and
      storing the peripheral search order.

16. The system of claim 15, wherein the peripheral device includes a keyboard.

17. The system of claim 15, wherein the computer system is for:
   checking the first port for the presence of the peripheral device by performing a port call to the first port.

18. The system of claim 17, wherein the computer system is for:
   detecting whether the peripheral device is present on the first port by determining whether the first port responds to the port call within a predetermined time period.

19. The system of claim 15, wherein the memory location includes a bit.

20. The system of claim 19, wherein the first indicator includes a first value of the bit, and wherein the second indicator includes a second value of the bit.

21. The system of claim 15, wherein the computer system is for:
   reading the first indicator from the memory location in response to the computer system being booted.

* * * * *